(12) United States Patent
Cho et al.

(10) Patent No.: US 8,923,243 B2
(45) Date of Patent: Dec. 30, 2014

(54) BRIDGE-BASED CELLULAR ETHERNET SYSTEM AND HANDOVER PROCESSING METHOD THEREFOR

(75) Inventors: Jae-Hun Cho, Suwon-si (KR); Seong-Taek Hwang, Pyeongtaek-si (KR); Jong-Ho Yoon, Suwon-si (KR); Hoon Kim, Suwon-si (KR)

(73) Assignees: Samsung Electronics Co. Ltd., Yeongtong-gu, Suwon-si, Gyeonggi-do (KR); University-Industry Cooperation Foundation of Korea Aerospace University, Hwajeon-dong, Deogyang-gu, Goyang-si, Gyeonggi-do (KR)

( * ) Notice: Subject to any disclaimer, the term of this patent is extended or adjusted under 35 U.S.C. 154(b) by 1782 days.

(21) Appl. No.: 11/968,682

(22) Filed: Jan. 3, 2008

(65) Prior Publication Data
US 2008/0159230 A1 Jul. 3, 2008

(30) Foreign Application Priority Data
Jan. 3, 2007 (KR) ........................ 10-2007-0000536

(51) Int. Cl.
| | | |
|---|---|---|
| G08C 17/00 | (2006.01) | |
| H04L 12/28 | (2006.01) | |
| H04W 4/00 | (2009.01) | |
| H04W 36/00 | (2009.01) | |
| H04J 1/16 | (2006.01) | |
| G06F 15/16 | (2006.01) | |
| H04W 80/02 | (2009.01) | |
| H04W 8/04 | (2009.01) | |

(52) U.S. Cl.
CPC .......... *H04W 36/0011* (2013.01); *H04W 80/02* (2013.01); *H04W 8/04* (2013.01); *H04W 8/057* (2013.01)

USPC ...... 370/331; 370/389; 370/395.21; 370/401; 455/433; 455/436; 455/452.2

(58) Field of Classification Search
USPC .......................................... 370/331
See application file for complete search history.

(56) References Cited

U.S. PATENT DOCUMENTS

| | | | | |
|---|---|---|---|---|
| 6,591,103 | B1 * | 7/2003 | Dunn et al. | 455/436 |
| 6,925,304 | B2 * | 8/2005 | Hameleers et al. | 455/445 |

(Continued)

FOREIGN PATENT DOCUMENTS

| | | | | |
|---|---|---|---|---|
| KR | 2004-89203 | 10/2004 | .............. | H04L 12/28 |
| KR | 2005-60638 | 6/2005 | .............. | H04L 12/24 |
| KR | 2006-12386 | 2/2006 | .............. | H04L 12/28 |
| KR | 2006-125337 | 12/2006 | .............. | H04L 29/06 |

*Primary Examiner* — Melvin H Pollack
(74) *Attorney, Agent, or Firm* — Cha & Reiter LLC

(57) ABSTRACT

A bridge-based cellular Ethernet system and a handover processing method therefore are provided. In the bridge-based cellular Ethernet system, an HLR manages configuration information about network entities, and a plurality of Base Station Bridges (BSBs) are connected to a plurality of Base Stations (BSs), each BSB including a layer 2 switch, and a plurality of SCBs connected to part of the BSBs under the SCBs. Each SCB includes a layer 2 switch forming a core network, and SCB monitors the signal power of a Mobile Node (MN) within its service area, determines whether the MN is to move to another site, selects a new SCB to which the MN is to move, sends necessary path information to associated SCBs and the HLR, for setting of the path information in the associated SCBs and the HLR, and commands a handover to the MN.

20 Claims, 7 Drawing Sheets

(56) References Cited

U.S. PATENT DOCUMENTS

| | | | |
|---|---|---|---|
| 7,035,646 B2 * | 4/2006 | Raffel et al. | 455/456.1 |
| 7,072,657 B2 * | 7/2006 | Watanabe et al. | 455/439 |
| 7,113,780 B2 * | 9/2006 | McKenna et al. | 455/431 |
| 7,127,241 B2 * | 10/2006 | Castrogiovanni et al. | 455/418 |
| 7,139,570 B2 * | 11/2006 | Elkarat et al. | 455/432.3 |
| 7,142,860 B2 * | 11/2006 | Mildh et al. | 455/443 |
| 7,155,526 B2 * | 12/2006 | Chaudhary et al. | 709/229 |
| 7,181,210 B2 * | 2/2007 | Zabawskyj et al. | 455/432.1 |
| 7,184,771 B1 * | 2/2007 | Mouly et al. | 455/450 |
| 7,212,836 B2 * | 5/2007 | Striuli | 455/552.1 |
| 7,242,678 B2 * | 7/2007 | O'Neill et al. | 370/349 |
| 7,308,263 B2 * | 12/2007 | Gallagher et al. | 455/439 |
| 7,356,001 B1 * | 4/2008 | Jones et al. | 370/331 |
| 7,362,727 B1 * | 4/2008 | O'Neill et al. | 370/331 |
| 7,426,380 B2 * | 9/2008 | Hines et al. | 455/404.2 |
| 7,469,142 B2 * | 12/2008 | Nelakanti et al. | 455/436 |
| 7,499,705 B2 * | 3/2009 | Rimoni et al. | 455/436 |
| 7,525,484 B2 * | 4/2009 | Dupray et al. | 342/450 |
| 7,525,936 B2 * | 4/2009 | Buckley et al. | 370/328 |
| 7,526,547 B2 * | 4/2009 | Rodrigo | 709/225 |
| 7,539,309 B2 * | 5/2009 | Stadelmann et al. | 380/270 |
| 7,554,967 B1 * | 6/2009 | Varadhan et al. | 370/352 |
| 7,564,853 B1 * | 7/2009 | Zhu et al. | 370/395.5 |
| 7,586,897 B2 * | 9/2009 | Ruffino et al. | 370/351 |
| 7,593,362 B1 * | 9/2009 | Casati et al. | 370/328 |
| 7,640,036 B2 * | 12/2009 | Kallio | 455/552.1 |
| 7,649,872 B2 * | 1/2010 | Naghian et al. | 370/338 |
| 7,693,093 B2 * | 4/2010 | Riedel et al. | 370/260 |
| 7,720,481 B2 * | 5/2010 | Gallagher et al. | 455/439 |
| 7,756,518 B2 * | 7/2010 | Xu et al. | 455/445 |
| 7,843,901 B2 * | 11/2010 | Silver et al. | 370/352 |
| 7,885,231 B2 * | 2/2011 | Kim et al. | 370/331 |
| 7,929,953 B2 * | 4/2011 | Jiang | 455/414.1 |
| 8,098,626 B2 * | 1/2012 | Kasapidis | 370/331 |
| 8,160,021 B2 * | 4/2012 | Ohba et al. | 370/331 |
| 8,254,929 B2 * | 8/2012 | Funabiki et al. | 455/436 |
| 8,279,829 B2 * | 10/2012 | Xia et al. | 370/331 |
| 8,345,627 B2 * | 1/2013 | Lott | 370/331 |
| 8,478,274 B2 * | 7/2013 | Kato et al. | 455/437 |
| 8,483,687 B2 * | 7/2013 | Williams et al. | 455/436 |
| 8,514,819 B2 * | 8/2013 | Tajima et al. | 370/336 |
| 8,570,976 B2 * | 10/2013 | Pan et al. | 370/331 |
| 2003/0013489 A1 * | 1/2003 | Mar et al. | 455/560 |
| 2003/0186694 A1 * | 10/2003 | Sayers et al. | 455/426.1 |
| 2003/0220101 A1 * | 11/2003 | Castrogiovanni et al. | 455/419 |
| 2004/0185859 A1 * | 9/2004 | Barkan | 455/449 |
| 2005/0286466 A1 * | 12/2005 | Tagg et al. | 370/329 |
| 2006/0030333 A1 * | 2/2006 | Ward et al. | 455/456.1 |
| 2006/0111112 A1 * | 5/2006 | Maveddat | 455/439 |
| 2006/0172774 A1 * | 8/2006 | Zabawskyj et al. | 455/560 |
| 2006/0217112 A1 * | 9/2006 | Mo | 455/422.1 |
| 2006/0286984 A1 * | 12/2006 | Bonner | 455/445 |
| 2006/0291455 A1 * | 12/2006 | Katz et al. | 370/355 |
| 2007/0155401 A1 * | 7/2007 | Ward et al. | 455/456.1 |
| 2008/0056184 A1 * | 3/2008 | Green | 370/329 |
| 2009/0111381 A1 * | 4/2009 | Johnson et al. | 455/63.4 |
| 2009/0147751 A1 * | 6/2009 | Gurusamy et al. | 370/331 |
| 2009/0191878 A1 * | 7/2009 | Hedqvist et al. | 455/441 |
| 2009/0216906 A1 * | 8/2009 | Weniger et al. | 709/246 |
| 2010/0131663 A1 * | 5/2010 | Lee et al. | 709/228 |
| 2013/0003703 A1 * | 1/2013 | Todd et al. | 370/331 |
| 2013/0023269 A1 * | 1/2013 | Wang et al. | 455/436 |

* cited by examiner

BRIDGE-BASED CELLULAR ETHERNET SYSTEM AND HANDOVER PROCESSING METHOD THEREFOR

CLAIM OF PRIORITY

This application claims the benefit under 35 U.S.C. §119(a) from a Korean Patent Application filed in the Korean Intellectual Property Office on Jan. 3, 2007 and assigned Serial No. 2007-00536, the entire disclosure of which is hereby incorporated by reference in its entirety.

BACKGROUND OF THE INVENTION

1. Field of the Invention

The present invention generally relates to mobile Internet. More particularly, the present invention relates to a bridge-based cellular Ethernet system for providing a high-speed handover service by a simple and efficient signaling procedure and a handover processing method therefore.

2. Description of the Related Art

At the present time, mobile Internet technology covers $3^{rd}$ Generation (3G) and $4^{th}$ Generation (4G) cellular systems based on the Public Land Mobile Network (PLMN) and Portable Internet (PI) or Wireless Broadband (WiBro) for Internet Protocol (IP)-based packet transmission. For ultra high-speed data communications and maximal use efficiency, a variety of standards for the mobile Internet have been proposed.

FIG. 1 illustrates the configuration of a Fast Mobile IPv6 network. In addition, FIG. 2 is a diagram illustrating a signal flow for an exemplary handover procedure in the Fast Mobile IPv6 network. Fast Mobile IPv6 is a protocol proposed to minimize the handover latency of Mobile IPv6. Some terminology of Fast Mobile IPv6 is first given below.

Mobile Node (MN): a mobile node supporting IPv6.
Access Point (AP): a Layer 2 (L2) entity connected to an IP subnet, for providing wireless connectivity to the MN.
AP-ID: an L2 address of an AP.
Access Router (AR): a default router connected to the MN.
Previous Access Router (PAR): an old AR that the MN is attached to before handover.
New Access Router (NAR): a new AR that the MN is attached to after the handover.
Previous Care-of-Address (PCoA): an MN's CoA that is valid in the subnet of the PAR.
New CoA (NCoA): an MN's CoA that is valid in the subnet of the NAR.
Router Solicitation for Proxy Advertisement (RtSolPr): a message from the MN to the PAR, requesting information about neighbor APs before the handover.
Proxy Router Advertisement (PrRtAdv): a message from the PAR to the MN in response to the RtSolPr message, containing the neighbor AP information. The PrRtAdv message is sent without the RtSolPr message in case of a network-initiated handover.
(AP-ID, AR-info) tuple: the L2 address and IP address of an AR to which an AP with an AP-ID is connected. This tuple contains a valid prefix. AR-info is composed of [Router's L2 address, Router's IP address, Prefix].
Assigned Addressing: a particular type of NCoA configuration in which the NAR assigns an IPv6 address to the MN.
Fast Binding Update (FBU): a message from the MN to the PAR, instructing the PAR to redirect the MN's packets towards the NAR.
Fast Binding acknowledgement (FBack): a response message for the FBU message from the PAR to the MN.
Fast Neighbor Advertisement (FNA): a message from the MN to the NAR, announcing attachment.
Handover Initiate (HI): a message from the PAR to the NAR to initiate a handover.
Handover Acknowledge (HAck): a message from the NAR to the PAR in response to the HI message.

Referring to FIG. 1, Access Routers (Ars) 103 and 104 forming a plurality of subnets are connected to a core IP network 10 with a plurality of routers 101 and 102. As an MN 115 moves from the Previous Access Router (PAR 103) to the New Access Router (NAR) 104, a handover is triggered. The handover procedure will be described with reference to FIG. 2.

Referring to FIG. 2, for handover, the mobile node (MN) first requests information about at least one Access Point (AP) detected in L2 to its PAR by sending a Router Solicitation for Proxy Advertisement (RtSolPr) message in step 201 and the PAR replies with a Proxy Router Advertisement (PrRtAdv) message with {AP-ID, AR-info} in step 202. ARs may periodically exchange information about APs attached to them with one another.

Upon receipt of the PrRtAdv message, the MN sets a new NCoA for use in a new AP to which that it will be attached according to the {AP-ID, AR-info} in step 203. When a handover event actually occurs in L2, the MN sends an FBU message to the PAR in step 204. Because the Fast Binding Update (FBU) includes the New CoA (NcoA), the PAR stores binding information for the NCoA and the PCoA and forwards packets directed to the MN toward the NAR though a tunnel which has been established with the NAR using the biding information in steps 209, 210 and 211. If possible, preferably but not necessarily, the FBU message is sent while the MN is still connected to the PAR. If not possible, the FBU message is sent after the MN is attached to the NAR. The PAR sends an FBack message to the MN in response to the FBU message in step 207.

The MN operates in different modes depending on whether the FBack message is received by the MN when it is attached to the PAR or the NAR. In the former case (predictive fast handover), which means that a tunnel has already been established before the MN is attached to the NAR, the MN sends an FNA to the NAR immediately after the attachment and receives buffered packets from the NAR in steps 212 and 214. Then the MN sends a Binding Update message to a Home Agent/Core Network (HA/CN) in step 215. The HA/CN replies with a Binding Ack message and updates binding information in step 216.

In this mode, upon receipt of the FBU message, the PAR sends a Handover Initiate (HI) message to the NAR to find out whether the MN-created NCoA included in the FBU message is acceptable in the NAR in step 205. If the NCoA is already in use, the NAR generates a new NCoA and sends a HAck message with the NCoA to the PAR in step 206 and the PAR sends an FBack message with the new NCoA to the MN in step 207. Therefore, the MN should use the new NCoA after the attachment to the NAR. On the other hand, if the MN-created NCoA is acceptable, no NCoA is included in the HAck message and the FBack message.

FIG. 3 is a diagram illustrating a signal flow for another exemplary handover procedure in the Fast Mobile IPv6 network illustrated in FIG. 1.

Referring to FIG. 3, the MN sends an RtSolPr message to the PAR in a similar manner as in the handover procedure depicted in FIG. 2 in step 301. After receiving a PrRtAdv message from the PAR in step 302 and setting a new NCoA for use in the new AP in step 303, the MN fails to receive an FBack message (reactive fast handover). This particular case occurs when the MN does not send an FBU message while it is connected to the PAR or a handover has occurred before receiving an FBack message in response to a transmitted FBU message.

Since the MN cannot determine whether or not the PAR has processed the FBU message successfully due to the reception failure of the FBack message, it sends an FBU message (initial transmission or retransmission) to the NAR immediately after its attachment to the NAR in step 305. The FBU message is carried in an FNA message such that the NAR can send packets immediately after processing the FBU message and determine whether the NCoA is acceptable. The NAR checks the validity of the NCoA set in the FBU message in step 306. If the NCoA is already in use, the NAR discards the packet and sends to the MN a Router Advertisement message with a Neighbor Advertisement Acknowledge (NAACK) option in step 307. This message contains an NCoA that the MN will use in the NAR.

Hence, the MN sends a new FBU message using the new NCoA to the NAR in steps 308, 309 and 310. The NAR forwards the FBU message to the PAR in step 311 and the PAR sends an FBack message to the NAR in step 312. Therefore, the PAR redirects the MN's packets to the NAR in step 313 and 314 and the NAR forwards the packets to the MN in step 315. Subsequently, binding information regarding the MN is updated in the HA/CN in steps 316 and 317.

As described above, although Fast Mobile IPv6 minimizes the handover latency of Mobile IPv6, a drawback with Fast Mobile IPv6 is that a new IP should be allocated each time the MN moves between ARs in view of the nature of an IP-layer handover protocol and thus particular signaling packets should be exchanged, thereby causing a delay. Especially when an NCoA set by the MN is not valid during a reactive handover, an additional signaling packet is needed to allocate a new NCoA, thereby adding to the delay.

SUMMARY OF THE INVENTION

The present invention has been made in part to address at least some of the problems and/or disadvantages in the art, and to provide at least some of the advantages described below. Accordingly, the present invention provides a bridge-based cellular Ethernet system for providing an efficient and fast handover by a simple and efficient signaling procedure, which in an exemplary embodiment, uses an L2 bridge in a mobile Internet, and a handover processing method therefore.

In accordance with at least one exemplary aspect of the present invention, there is provided a bridge-based cellular Ethernet system, in which an HLR manages configuration information about network entities by storing in a table an IP address of an MN within a network, a MAC address of the MN, and an address of a site in which the MN is located, a plurality of BSBs are connected to a plurality of BSs, each BSB including a layer 2 switch, and a plurality of SCBs are connected to part of the BSBs under the SCBs, each SCB including a layer 2 switch forming a core network, for sending frames to other SCBs in a MAC-in-MAC manner, querying the HLR about a correspondent node with which an MN within the each SCB requests communications, and sending a frame to an SCB of a site in which the correspondent node is located. Each SCB monitors the signal power of the MN, determines whether the MN is to move to another site, selects a new SCB to which the MN is to move, sends necessary path information to associated SCBs and the HLR, for setting of the path information in the associated SCBs and the HLR, and commands a handover to the MN.

In accordance with another exemplary aspect of the present invention, there is provided a handover processing method in a bridge-based cellular Ethernet including a plurality of BSBs connected to a plurality of BSs, each BSB including a layer 2 switch, a plurality of SCBs connected to part of the BSBs under the SCBs, each SCB including a layer 2 switch forming a core network, and an HLR for managing configuration information about network entities, in which an old SCB monitors the signal power of an MN within its service area, determines whether the MN is to move to another site, selects a new SCB to which the MN is to move, sends necessary path information to the new SCB, an anchor SCB, and the HLR, for updating the path information, and commands a handover to the MN by the old SCB, the anchor SCB relays a frame destined for the MN to the new SCB according to the path information without sending the frame to the old SCB, and the new SCB receives the frame destined for the MN from the anchor SCB, buffers the received frame, and sends the buffered frame to the MN when the MN completely moves to the new SCB.

BRIEF DESCRIPTION OF THE DRAWINGS

The above features and advantages of certain exemplary aspects and embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The examples defined in the description such as a detailed construction and elements are provided. For purposes of illustration and not to define or limit the invention to the examples shown and described. Accordingly, a person of ordinary skill in the art will recognize that various changes and modifications of the exemplary aspects and exemplary embodiments described herein can be made without departing from spirit of the invention and the scope of the appended claims. Also, descriptions of well-known functions and constructions may be omitted for clarity and conciseness so as not to obscure.

Ethernet is one of the most widespread technologies used for data transmission between MNs or users. Due to the successful deployment of Ethernet between MNs or users, extension of the L2 Ethernet technology to Local Area Network (LAN) and Wide Area Network (WAN)/Metropolitan Area Network (MAN) is under discussion. The present invention is intended to provide a fast and more easily manageable handover service by covering the service area of an existing L3 or higher layer entity in L2 in a major future-generation wireless communication network, for example, a WiBro network.

Figure 1:
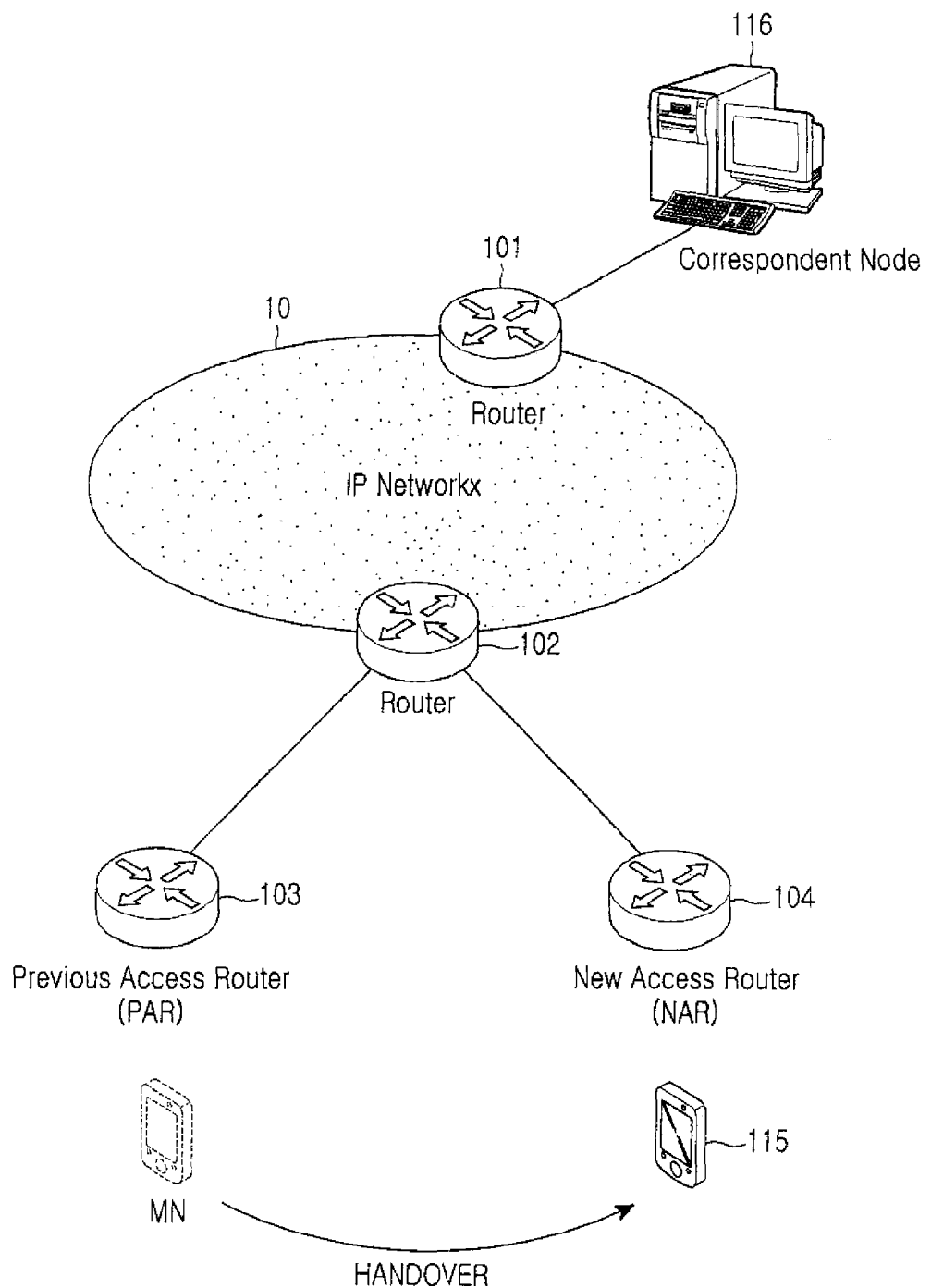
FIG. 1 illustrates the configuration of a Fast Mobile IPv6 network.
Figure 2:
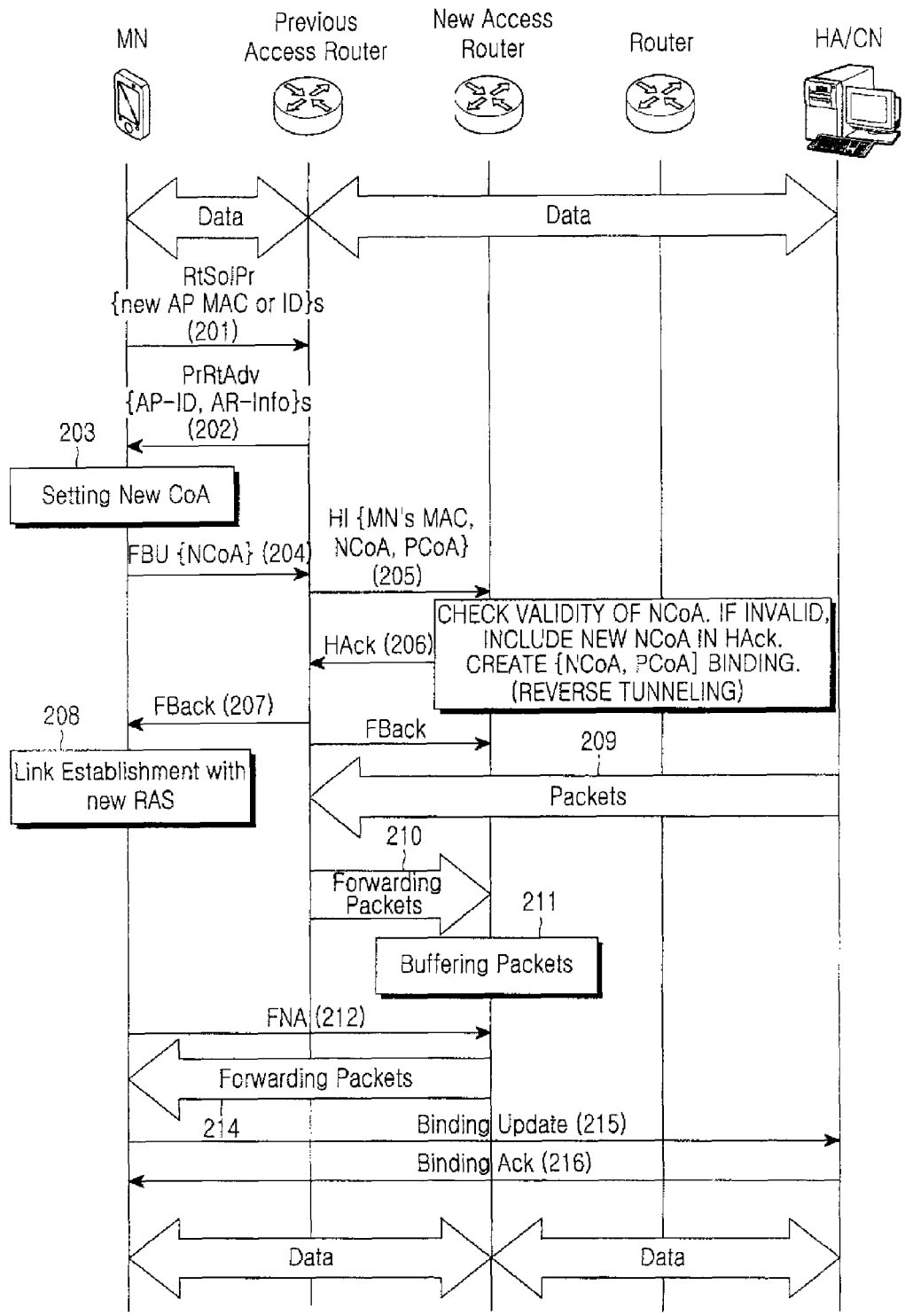
FIG. 2 is a diagram illustrating a signal flow for an exemplary handover procedure in the Fast Mobile IPv6 network illustrated in FIG. 1.
Figure 3:
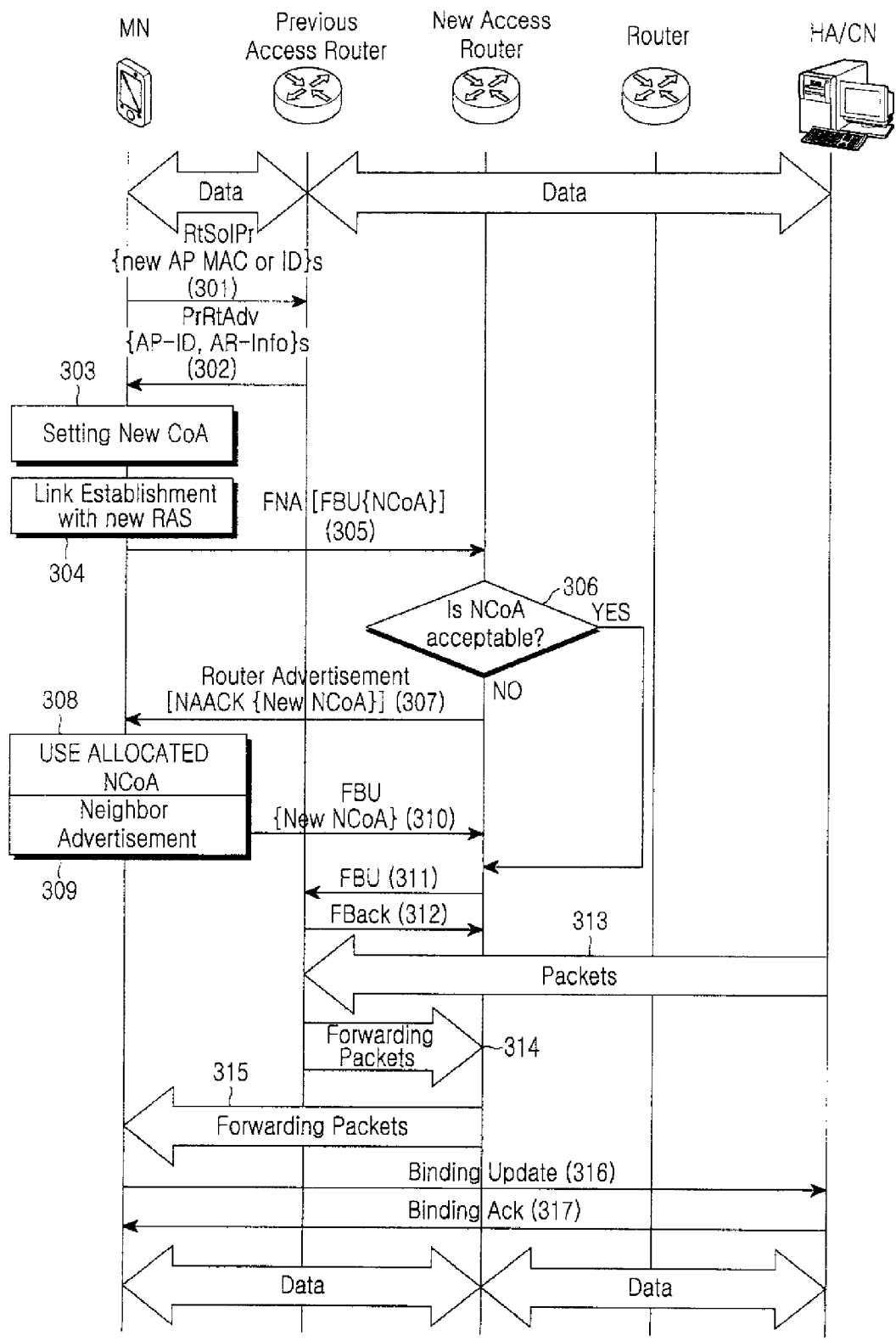
FIG. 3 is a diagram illustrating a signal flow for another exemplary handover procedure in the Fast Mobile IPv6 network illustrated in FIG. 1.
Figure 4:
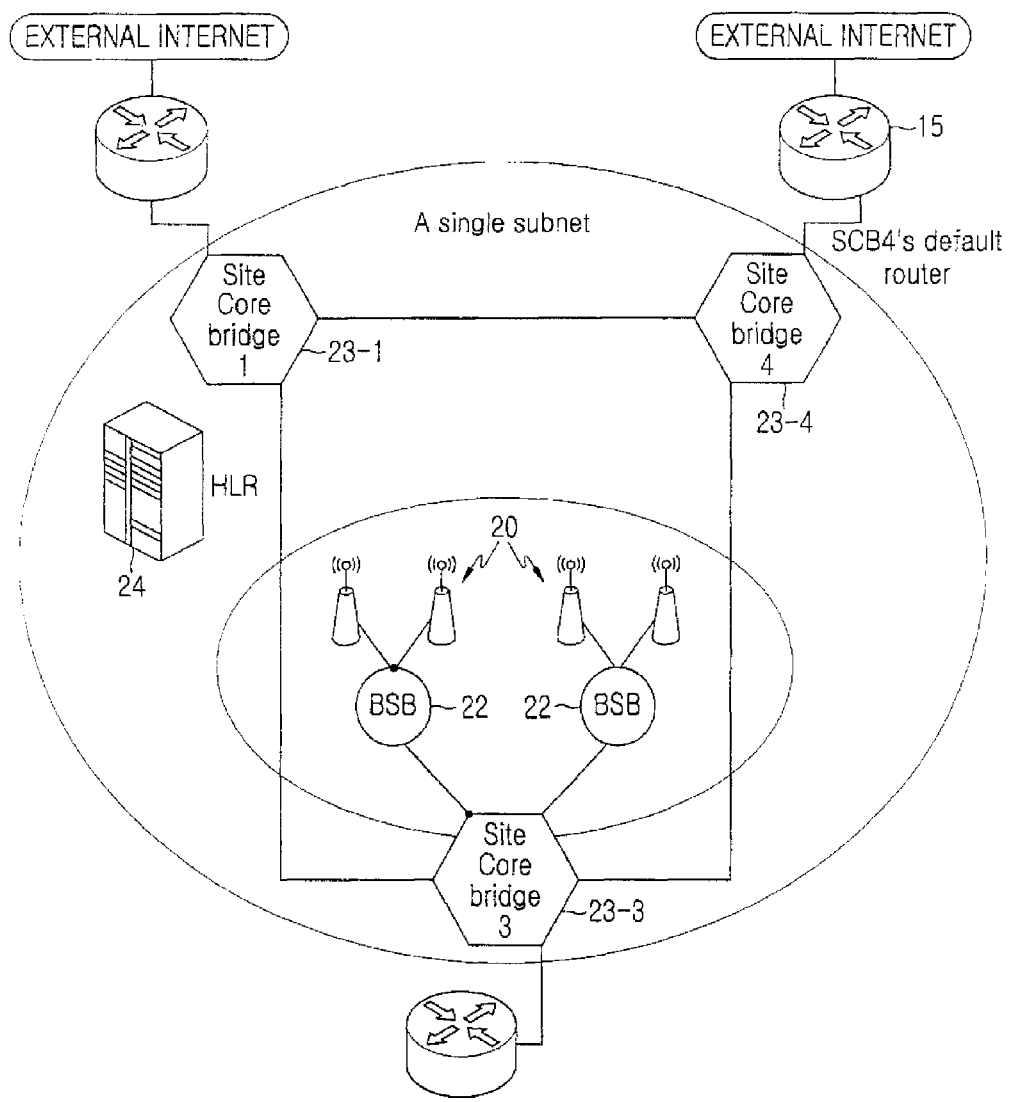
FIG. 4 illustrates the configuration of a bridge-based cellular Ethernet to which the present invention is applied.

FIG. 4 illustrates the configuration of a bridge-based cellular Ethernet to which the present invention is applied. Referring to FIG. 4, the bridge-based cellular Ethernet includes a Mobile Network MN (not shown), Base Stations (BSs) 20, Base Station Bridges (BSBs) 22, Site Core Bridges (SCBs) 23-1 to 23-4 (collectively denoted by 23-x), a Home location Register (HLR) 24, and external routers 15.

The BSBs 22 are bridges with L2 switches connected to the BSs 20. The SCBs 23-x are bridges with L2 switches forming a CN, connected to one another in the form of a mesh. The HLR 24 is a server for managing the configuration information of network entities. It stores a table of the IP addresses and Media Access Control (MAC) addresses of all MNs, which are turned on and the addresses of SCBs to which they belong.

Each SCB 23-x statically acquires the MAC address of an external default router 15 connected to it, for relaying an egress frame, i.e., a frame input to the external default router. The static MAC address setting obviates the need for querying about the MAC address by an Address Resolution Protocol (ARP) frame, thereby reducing an ARP-caused load on the network. The SCB 23-x statically registers its individual MAC address to other SCBs in the CN for the following reasons. First, the SCBs form the CN of the cellular Ethernet and there is not a great change in the CN despite a change in cells, such as cell addition. Second, since an operator does not have much difficulty in manually setting the SCBs, an address learning function may not be required. Consequently, each SCB has knowledge of the MAC address of the other SCBs in the CN.

Figure 5:
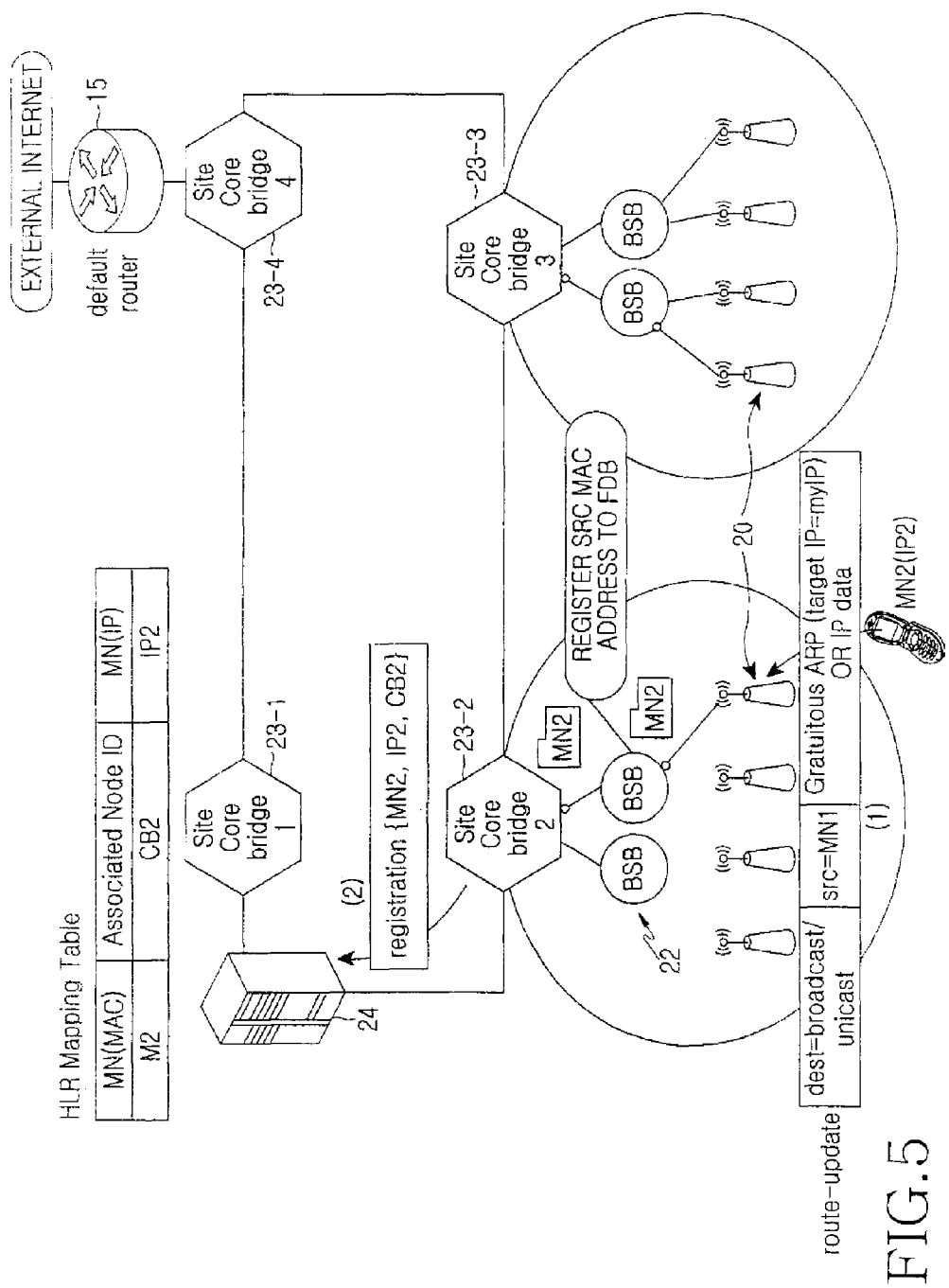
FIG. 5 illustrates an initial registration operation of an MN to the cellular Ethernet illustrated in FIG. 4.

FIG. 5 illustrates an example of an initial registration operation of an MN to the cellular Ethernet illustrated in FIG. 4.

Referring to FIG. 5, when each MN (MN2 herein) initially registers to the network, it sends a Gratuitous ARP frame with its {MAC address, IP address} to a BSB 20 connected to it in step (1). This ARP frame is propagated upstream to the SCB 23-2 so that MN2 is registered with the Filtering DataBase (FDB) of each bridge (BSB and SCB). In step (2), the SCB 23-2 sends information about MN2, i.e. {MAC address of MN, IP address of MN, MAC address of SCB} to the HLR 24 on behalf of MN2 and the HLR 24 registers the received information.

For the registration, the SCB 23-x uses a modification to an 802.1 Registration Protocol message, for a unicast purpose, or a User Datagram Protocol (UDP)-based registration message. In the illustrated case of FIG. 5, the MAC address of MN2 is set as M2, an associated SCB ID is set as CB2, and the IP address of MN2 is set as IP2 in a table of the HLR 24.

According to the present invention, in this cellular Ethernet, an MN sends an ARP frame to its SCB, querying for the MAC address of a correspondent node. The SCB queries the HLR 24 for the MAC address of the correspondent node and sends an ARP response with the MAC address of the correspondent node to the MN. The correspondent node may be connected to the same SCB or a different SCB. In the latter case, the SCB additionally acquires the address of the SCB of the correspondent node from the HLR 24 and frames are exchanged between both SCBs in a MAC-in-MAC manner.

When the MAC-in-MAC frame transmission scheme is set, each SCB sends a MAC frame received from the MN connected to the SCB by MAC-in-MAC encapsulation. Here, the SCB sets a Destination Address (DA) area to the ID (i.e. MAC address) of the SCB of the other MN in a MAC-in-MAC frame header by checking the DA area of the MAC frame. Accordingly, all branch switches switch the frame, referring to the DA area of an outer MAC in the network. Upon receipt of a MAC-in-MAC frame with an outer DA set to the ID of an SCB, the SCB eliminates the outer MAC and sends the original MAC frame to the MN connected to the SCB.

Meanwhile, if the MN determines that the correspondent node is located in an external network, it first sends to the SCB an ARP request querying about the address of its default gateway connected to the external network. The SCB sends an ARP response using already preserved information about the default gateway, so that the MN can communicate with the external network. On the other hand, upon receipt of a communication request from an MN in an external network, an SCB connected to the external network queries the HLR 24 about {IP address of called MN} that a router requests by an ARP request, receives the MAC address of an SCB to which the MN is connected and the MAC address of the MN from the HLR 24, and notifies the router of the MAC addresses by an ARP response. The SCB connected to the external network may broadcast the ARP request received from the router within the network. As the router acquires the MAC address of the called MN by the ARP response, it relays IP packets normally and each SCB relays a MAC-in-MAC frame according to the MAC addresses until the SCB connected to the MN receives the frame.

Compared to a conventional BS backbone network with routers, a BS backbone network according to the present invention is configured with Ethernet bridges in the above cellular Ethernet. The resulting network simplicity facilitates network management and enables handover in L2, not in L3. Therefore, the handover becomes faster than that of conventional BS backbone networks. Herein below, a handover operation according to the present invention will be described in detail.

Figure 6A:
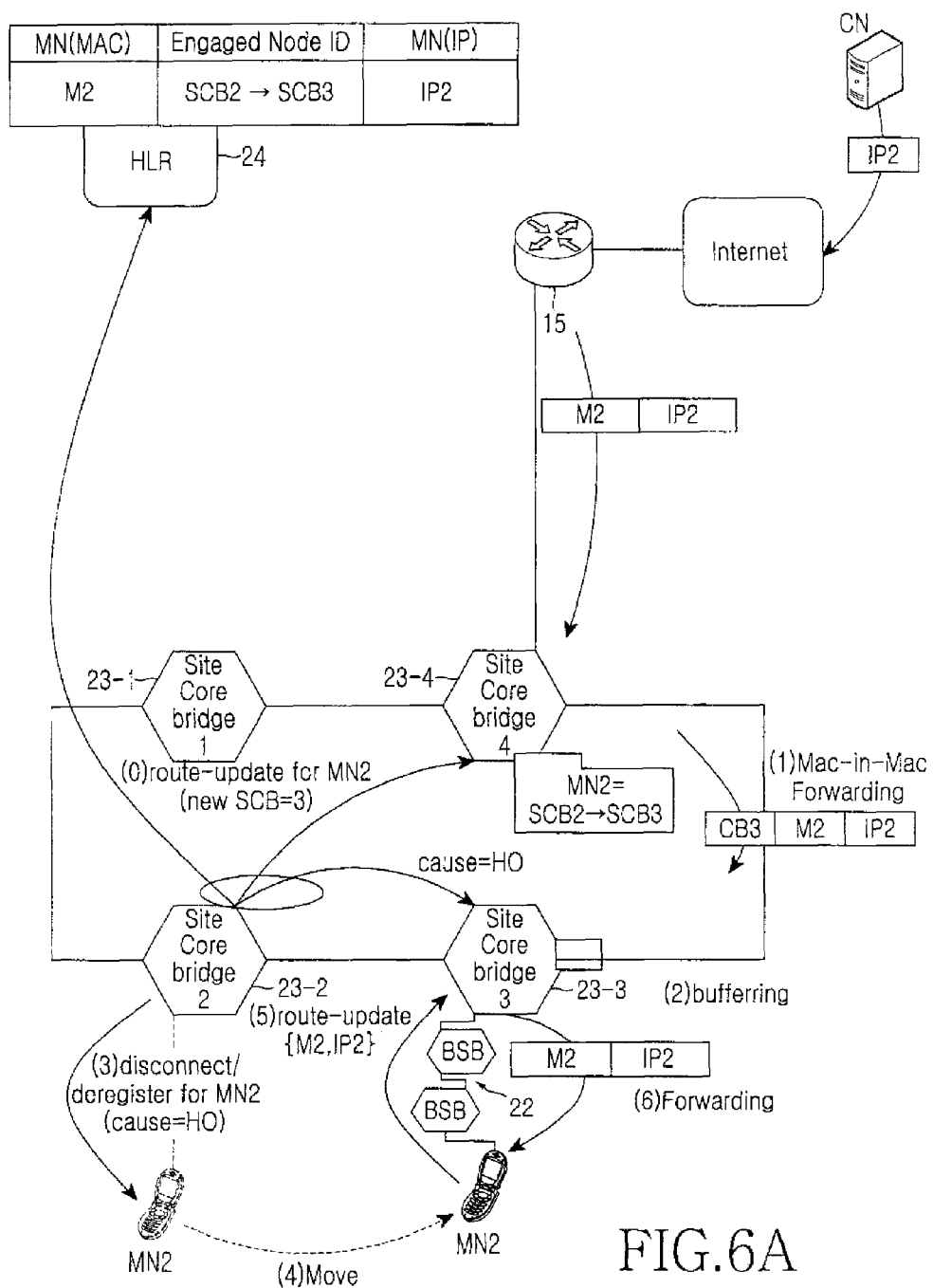
FIGS. 6A and 6B illustrate a handover procedure in the cellular Ethernet illustrated in FIG. 4 according to an exemplary embodiment of the present invention.
Figure 6B:
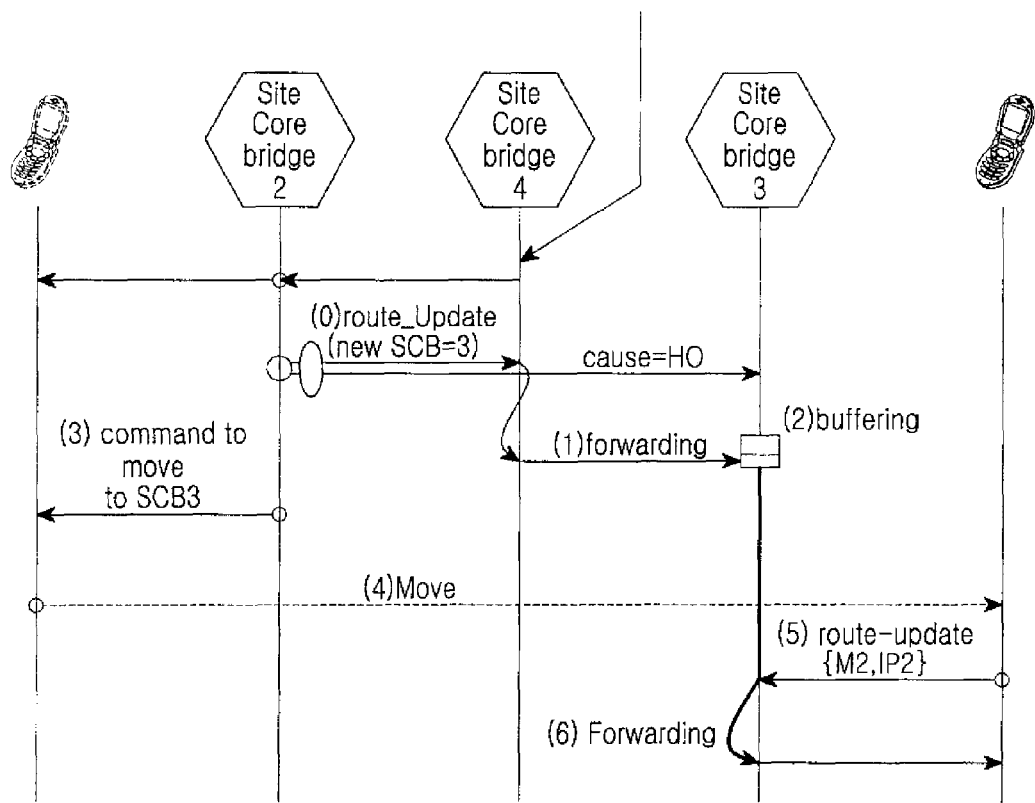

FIGS. 6A and 6B illustrate a handover procedure in the cellular Ethernet illustrated in FIGS. 4 and 5 according to an exemplary embodiment of the present invention. The handover procedure is depicted in the context of the network configuration in FIG. 6A and with passage of time in FIG. 6B. In the illustrated case of FIGS. 6A and 6B, MN2 moves from the SCB 23-2 to the SCB 23-3. Thus, the SCB 23-4 (anchor bridge) connected to the default router 15 switches frame relaying from the SCB 23-2 to the SCB 23-3.

According to the present invention, the handover procedure is exemplified in that an old SCB connected to an old BS selects a new SCB and sends necessary path information to associated entities before a handover, and then commands the handover to an MN, thereby reducing a handover latency. Accordingly, steps (0) to (6) will be sequentially described below referring to FIGS. 6A and 6B.

Step (0): The old SCB (herein, the SCB 23-2) monitors the signal power of MN2 within its service area. When the signal power becomes weak, the SCB 23-2 considers that MN2 moves to another site and performs the handover procedure for MN2 according to the present invention. Since MN2 will move to an end BSB of a chain of neighboring BSBs 22, i.e. to a neighbor site, the SCB 23-2 considers a neighbor site in a geographical location to which MN2 moves to be the new site.

The new site can be selected according to certain predetermined criteria, such as selecting the end BSB with a strongest signal strength from the MN, or selecting an end from the closest SCB. In the case where the MN is located on the boundary of, for example, three SCBs, each SCB detects all the signal strength from the MN, exchanges the respectively detected signal strength with the neighboring SCBs, and then determines whether the MV moves from site to site by the increasing/decreasing signal strength. If there are multiple signals received (such as three SCBs) with an equal highest strength, in an exemplary embodiment, the SCB may wait until one of the signals strength becomes the highest signal strength received without dropping connection from the current SCB. It is also possible that other criteria, such as (for example) order received, could be used when the signal strength is the same for multiple SCBs. A person of ordinary skill in the art should understand and appreciate that the present invention is not limited to the above description.

After determining which is the new path to which MN2 will be connected, the SCB 23-2 updates path information with the new path. The new path information is sent to the HLR 24, a new SCB (herein, the SCB 23-3), and an anchor SCB (herein, the SCB 23-4).

According to a router-update message for the path information updating for the handover initiated by the SCB 23-2, the HLR 24 updates the engaged Node ID of MN2 from the ID of the SCB 23-2, SCB2 to the ID of the SCB 23-3, SCB3. The SCB 23-3 prepares for attachment of MN2, for example, by buffering data destined for MN2. The anchor SCB 23-4 forwards data directed to MN2.

Step (1): Upon receipt of the updated path information, the anchor SCB 23-4 stops sending frames to the old SCB 23-2. To relay frames to the new SCB 23-3, the anchor SCB 23-4 encapsulates a frame for MN2 in the MAC-in-MAC manner by setting a destination MAC address to the address of the new SCB 23-3 and forwards the frame to the new SCB 23-3.

Step (2): The new SCB 23-3 decapsulates a MAC-in-MAC header from packets received from the anchor SCB 23-4 and buffers the frame in its buffer. When MN2 moves to the SCB 23-3, the SCB 23-3 starts the buffered frame to MN2.

Step (3): The old SCB 23-2 commands MN2 to move to the new SCB 23-3 a predetermined time subsequent thereto in case where an on-the-fly packet is lost due to a transmission delay difference that may be produced during the movement.

Step (4): MN2 moves to the new SCB 23-3 at the predetermined time later (i.e. a predetermined subsequent time that was specified by the old SCB 23-2).

Step (5): MN2 is attached to the new SCB 23-3 and updates path information by sending its MAC address and IP address {M2, IP2} to the new SCB 23-3.

Step (6): The new SCB 23-3 forwards the buffered frame to MN2.

In this way, a handover is performed without an IP tunneling delay that may be produced during L3 handover and with minimal packet loss.

In Fast Mobile IPv6, conventionally, nine signaling packets need to be exchanged in a basic case. In case of a reactive handover, if an MN-created NCoA is not valid, eleven signaling packets are to be exchanged. Also, the number of Binding Update messages increases in proportion to that of correspondent nodes. This increase in signaling packets in number increases protocol complexity and handover latency.

In contrast, the handover procedure of the present invention decreases the handover latency to a connection delay level and that without frame loss. Therefore, a fast and efficient handover can be provided and network efficiency can be increased.

While the invention has been shown and described with reference to certain exemplary embodiments of the present invention thereof, it will be understood by a person of ordinary skill in the art that various changes in form and details may be made therein without departing from the spirit of the invention and the scope of the appended claims. cm What is claimed is:

What is claimed is:

1. A bridge-based cellular Ethernet system, comprising:
a Home Location Register (HLR) for managing configuration information about network entities comprising a table for storing an Internet Protocol (IP) address of a Mobile Node (MN) within a network, a Media Access Control (MAC) address of the MN, and an address of a site in which the MN is located;
a plurality of Base Stations (BSs) configured for communicating with one or more MNs;
a plurality of Base Station Bridges (BSBs), each BSB being connected to two or more of said plurality of Base Stations (BSs), and each BSB including a layer 2 switch; and
a plurality of Site Core Bridges (SCBs), wherein each SCB is connected to one or more of the BSBs, each SCB comprising a layer 2 switch forming a core network for sending frames to other SCBs of said plurality of SCBs in a MAC-in-MAC manner, and for querying the HLR about a correspondent node with which an MN associated within a particular SCB requests communications, and for sending a frame to another SCB of said plurality of SCBs of a site in which the correspondent node is located,
wherein each SCB is configured for monitoring a signal power of the MN, for determining whether the MN is to move to another SCB, for selecting a new SCB from said plurality of SCBs to which the MN is to be moved to at a predetermined subsequent time, for sending necessary path information to associated SCBs of said plurality of SCBs and the HLR for setting of the path information in the associated SCBs and the HLR nonreactively prior to criteria for performing a handover being reached, so that a reactive handover occurs between SCBs without using routers and without an IP tunneling delay to reduce handover latency, and then for commanding a handover to the MN.

2. The bridge-based cellular Ethernet system of claim 1, wherein the HLR is configured for updating engaged node information of the MN according to the path information, and wherein the new SCB buffers data destined for the MN, and an anchor SCB forwards data destined for the MN to the new SCB.

3. The bridge-based cellular Ethernet system of claim 1, wherein said particular SCB commands the MN to perform the handover at a predetermined subsequent time.

4. The bridge-based cellular Ethernet system of claim 3, where the predetermined time for handover to the new SCB is specified by said particular SCB.

5. The bridge-based cellular Ethernet system of claim 1, wherein when said particular SCB determines that the MN will move to another site, said particular SCB considers an end BSB of a geographically neighboring site to be connected to the MN as a new site.

6. The bridge-based cellular Ethernet system of claim 3, wherein when said particular SCB determines that the MN will move to another site, said particular SCB considers an end BSB of a geographically neighboring site to be connected to the MN as a new site.

7. A handover processing method in a bridge-based cellular Ethernet including a plurality of Base Station Bridges (BSBs) connected to a plurality of Base Stations (BSs), each BSB including a layer 2 switch, a plurality of Site Core Bridges (SCBs) connected to part of the BSBs under the SCBs, each SCB including a layer 2 switch forming a core network, and a Home Location Register (HLR) for managing configuration information about network entities, the method comprising:

monitoring a signal power of a Mobile Node (MN) within a service area of an old SCB, and based on the signal power determining whether the MN is to move to another site, selecting a new SCB to which the MN is to move at a predetermined subsequent time, sending necessary path information to the new SCB, an anchor SCB, and the HLR for updating the path information nonreactively prior to criteria for performing a handover being reached, so that a reactive handover between the old SCB and the new SCB occurs without using routers and without an IP tunneling delay to reduce handover latency, and then commanding a handover to the MN by the old SCB; and relaying a frame destined for the MN to the new SCB according to the path information without sending the frame to the old SCB by the anchor SCB.

8. The handover processing method of claim 7, wherein the handover commanding comprises commanding the MN to perform the handover at a predetermined subsequent time by the old SCB.

9. The handover processing method of claim 7, wherein the determination as to whether the MN is to move to another site includes, when the old SCB determines that the MN will move to another site, considering an end BSB of a geographically neighboring site for connection with the MN as a new site.

10. The handover processing method of claim 8, wherein the determination as to whether the MN is to move to another site includes, when the old SCB determines that the MN will move to another site, considering an end BSB of a geographically neighboring site for connection with the MN to be a new site.

11. The handover processing method of claim 7, wherein the considering step comprises selecting the end BSB with a strongest signal strength from the MN.

12. The handover processing method of claim 7, wherein the considering step comprises selecting the end BSB with a strongest signal strength from the MN.

13. A handover processing method in a bridge-based cellular Ethernet including a plurality of Base Station Bridges (BSBs) connected to a plurality of Base Stations (BSs), each BSB including a layer 2 switch, a plurality of Site Core Bridges (SCBs) connected to part of the BSBs under the SCBs, each SCB including a layer 2 switch forming a core network, and a Home Location Register (HLR) for managing configuration information about network entities, the method comprising:

receiving by a new SCB, a path information of a handover for Mobile Node (MN) from an old SCB for updating the path information nonreactively prior to criteria for performing the handover being reached, so that a reactive handover between the old SCB and the new SCB occurs without using routers and without an IP tunneling delay to reduce handover latency;

relaying a frame destined for the MN to the new SCB according to the path information without sending the frame to the old SCB by the anchor SCB;

receiving a frame destined for the MN from the anchor SCB, buffering the received frame, and sending the buffered frame to the MN when the MN completely moves to the new SCB, by the new SCB.

14. The handover processing method of claim 13, wherein the old SCB monitors a signal power of the MN within a service area of the old SCB, and based on the signal power determining whether the MN is to move to another site, selecting the new SCB to which t(New) he MN is to move at a predetermined subsequent time, sending necessary path information to the new SCB, an anchor SCB, and the HLR for updating the path information.

15. The handover processing method of claim 14, wherein the determination as to whether the MN is to move to another site includes, when the old SCB determines that the MN will move to another site, considering an end BSB of a geographically neighboring site for connection with the MN as a new site.

16. A bridge-based cellular Ethernet including a plurality of Base Station Bridges (BSBs) connected to a plurality of Base Stations (BSs), each BSB including a layer 2 switch, a plurality of Site Core Bridges (SCBs) connected to part of the BSBs under the SCBs, each SCB including a layer 2 switch forming a core network, and a Home Location Register (HLR) for managing configuration information about network entities, each of the SCBs comprising:

processing unit for sending frames to other SCBs of said plurality of SCBs in a MAC-in-MAC manner, and for querying the HLR about a correspondent node with which an MN associated within a particular SCB requests communications, and for sending a frame to another SCB of said plurality of SCBs of a site in which the correspondent node is located;

memory for storing the frames and information about the MN, wherein each of the SCB is configured for monitoring a signal power of the MN, for determining whether the MN is to move to another SCB, for selecting a new SCB from said plurality of SCBs to which the MN is to be moved to at a predetermined subsequent time, for sending necessary path information to associated SCBs of said plurality of SCBs and the HLR for setting of the path information nonreactively prior to criteria for performing a handover being reached, so that a reactive handover occurs between SCBs without using routers and without an IP tunneling delay to reduce handover latency, and then for commanding a handover to the MN.

17. The SCB of claim 16, wherein the new SCB buffers data destined for the MN, and an anchor SCB forwards data destined for the MN to the new SCB.

18. The SCB of claim 16, wherein said particular SCB commands the MN to perform the handover at a predetermined subsequent time.

19. The SCB of claim 16, wherein when said particular SCB determines that the MN will move to another site, said particular SCB considers an end BSB of a geographically neighboring site to be connected to the MN as a new site.

20. The SCB of claim 18, wherein when said particular SCB determines that the MN will move to another site, said particular SCB considers an end BSB of a geographically neighboring site to be connected to the MN as a new site.

* * * * *

UNITED STATES PATENT AND TRADEMARK OFFICE
CERTIFICATE OF CORRECTION

| | | |
|---|---|---|
| PATENT NO. | : 8,923,243 B2 | Page 1 of 1 |
| APPLICATION NO. | : 11/968682 | |
| DATED | : December 30, 2014 | |
| INVENTOR(S) | : Jae-Hun Cho et al. | |

It is certified that error appears in the above-identified patent and that said Letters Patent is hereby corrected as shown below:

In the Claims

Column 10, Claim 14, Line 7 should read as follows:
--…to which the MN…--

Signed and Sealed this
Thirty-first Day of March, 2015

Michelle K. Lee
*Director of the United States Patent and Trademark Office*